March 1, 1966 F. BRETVELD ETAL 3,237,699
BULB DIGGING AND SEPARATING APPARATUS
Filed March 4, 1964 4 Sheets-Sheet 2
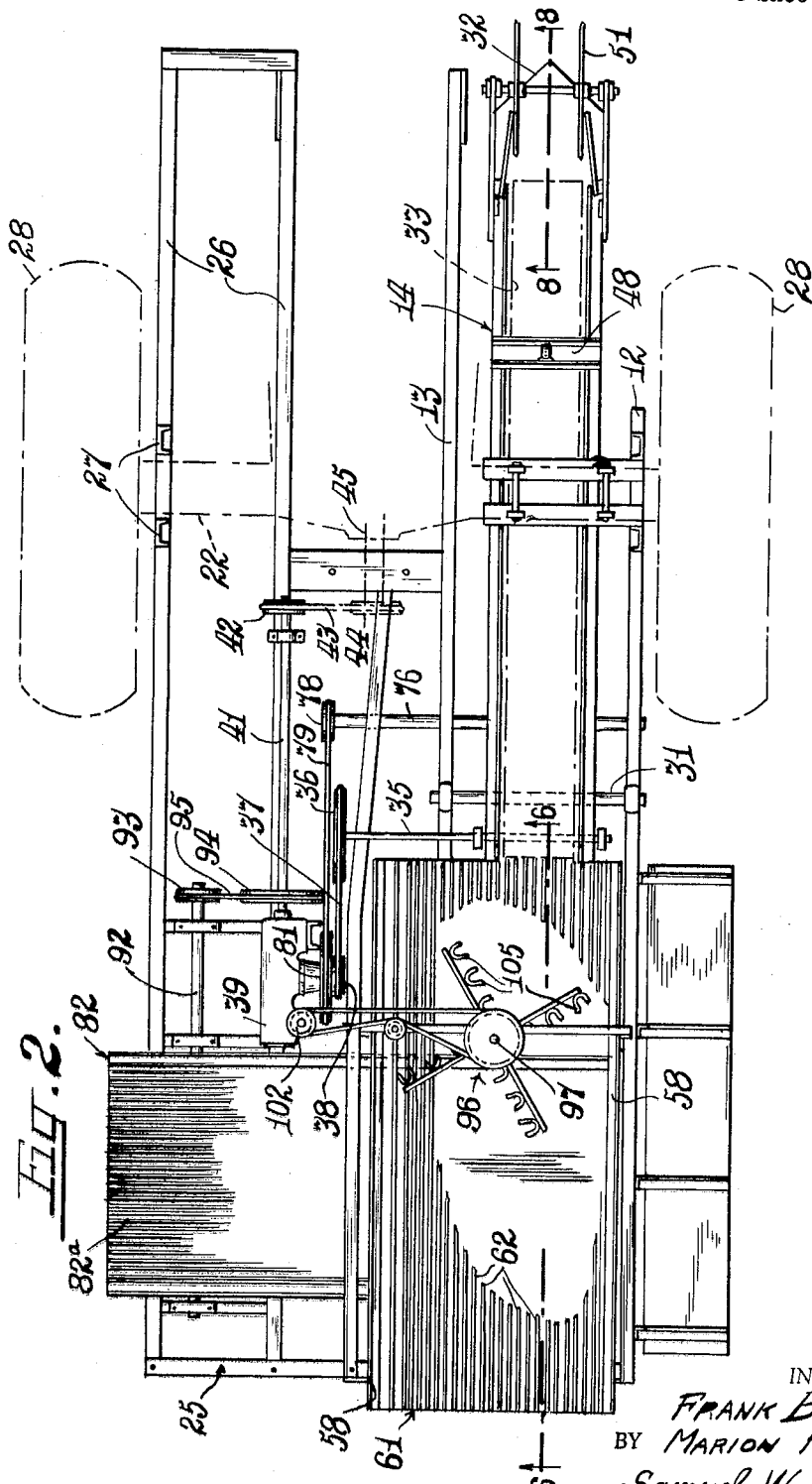
INVENTOR.
FRANK BRETVELD
BY MARION ROMEIN
Samuel W. Kipnis
Atty.

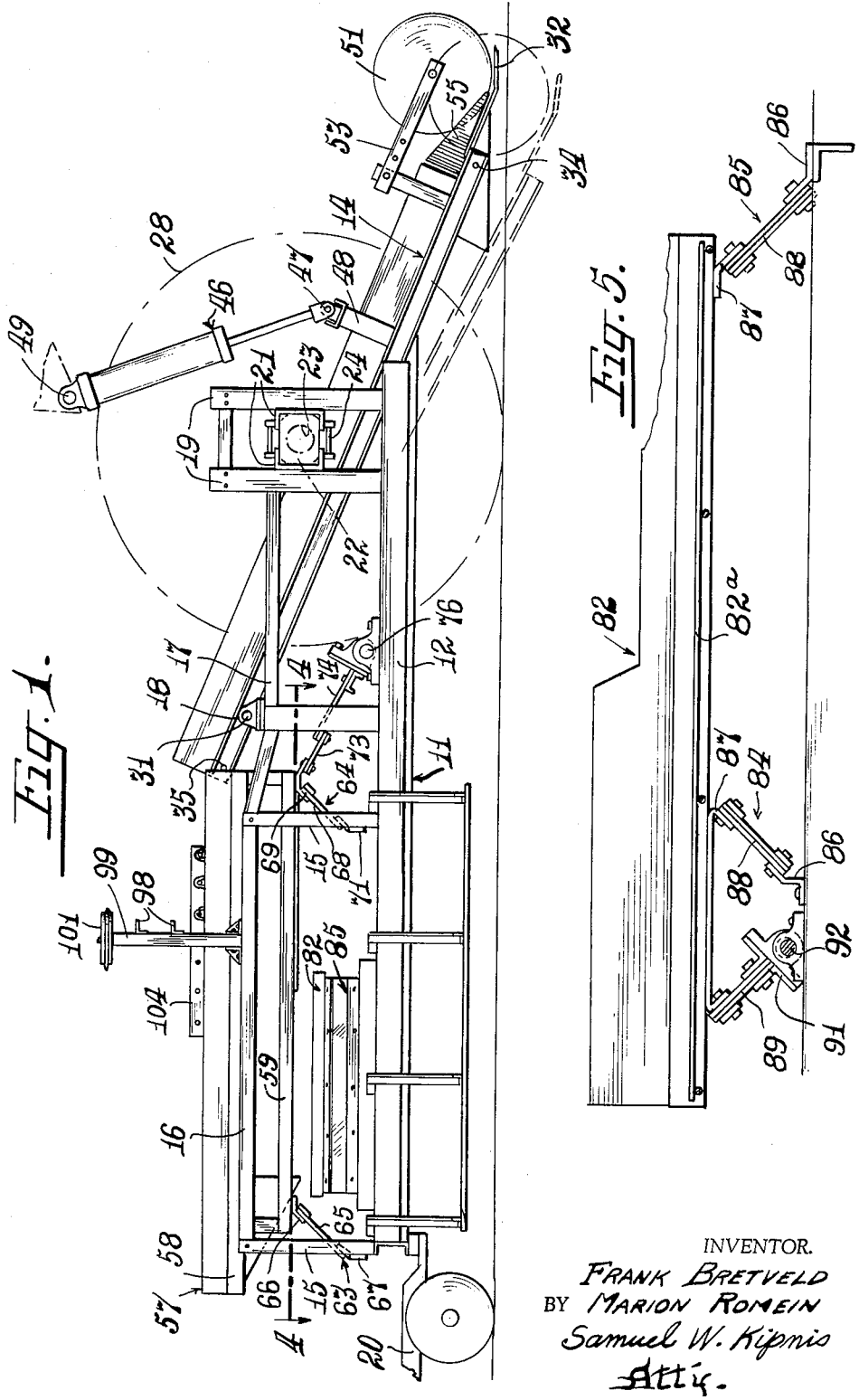

March 1, 1966  F. BRETVELD ETAL  3,237,699
BULB DIGGING AND SEPARATING APPARATUS
Filed March 4, 1964  4 Sheets-Sheet 3
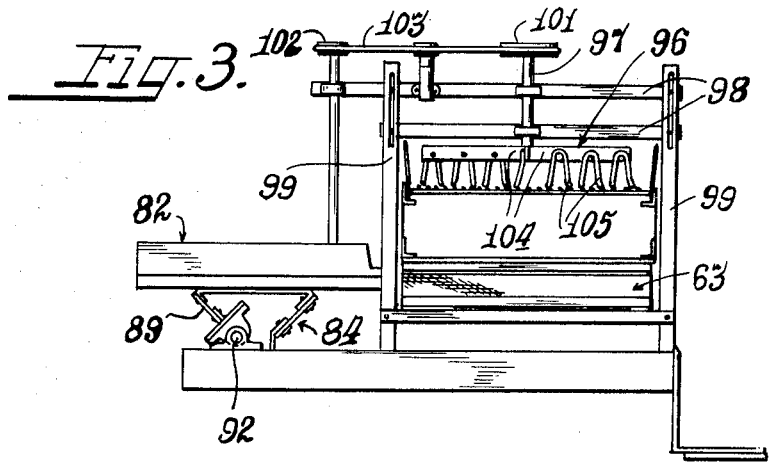
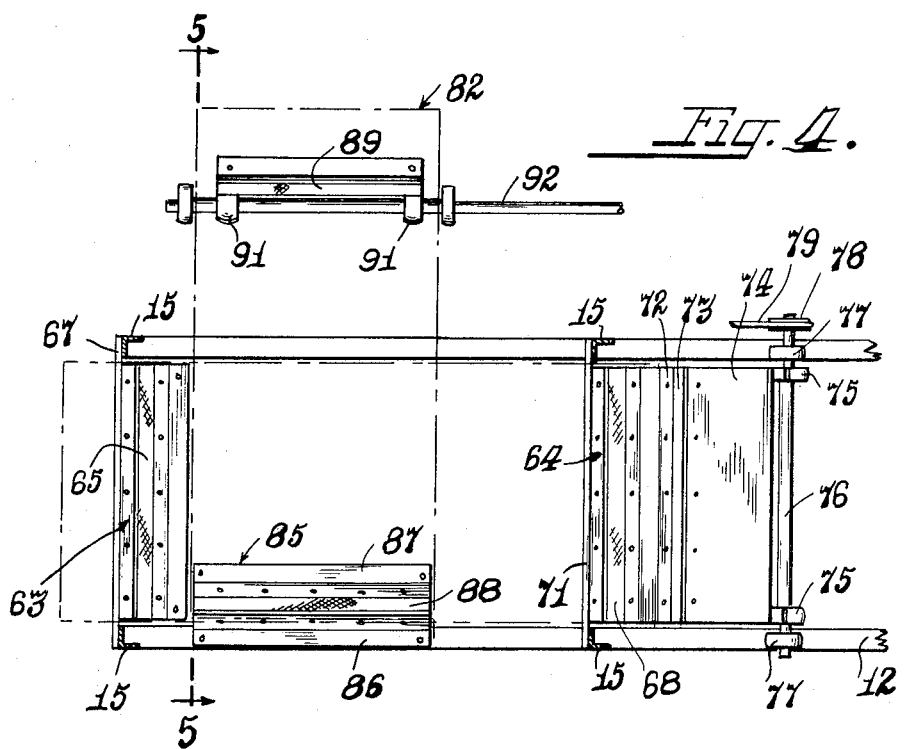
INVENTOR.
FRANK BRETVELD
BY MARION ROMEIN
Samuel W. Kipnis
Att'y.

March 1, 1966 F. BRETVELD ETAL 3,237,699
BULB DIGGING AND SEPARATING APPARATUS
Filed March 4, 1964 4 Sheets-Sheet 4
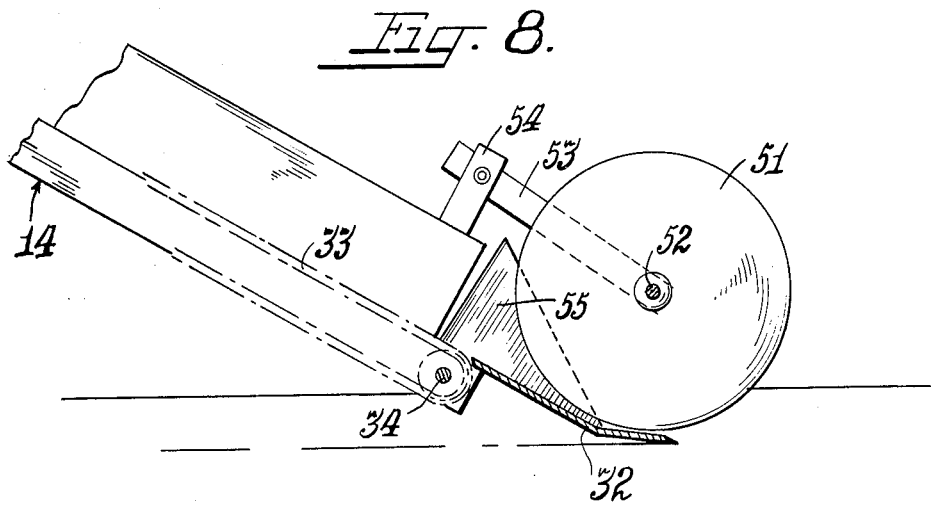
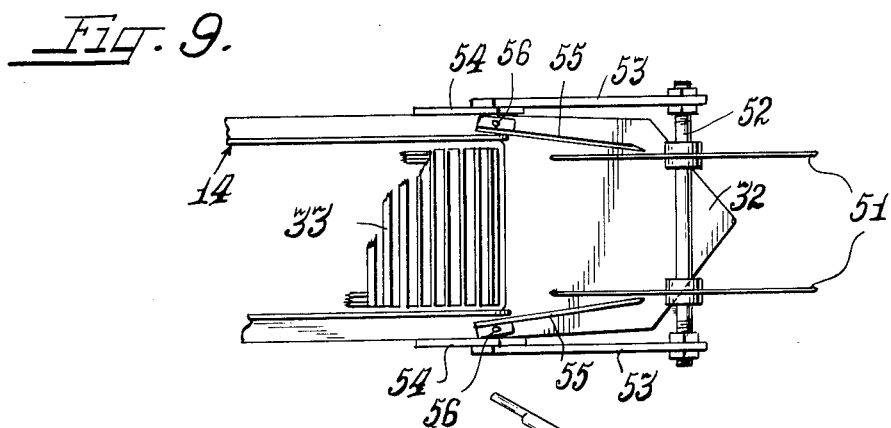
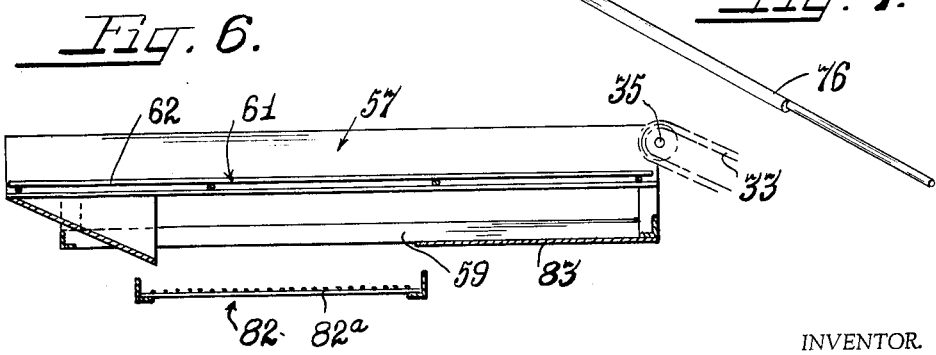
INVENTOR.
FRANK BRETVELD
BY MARION ROMEIN
Samuel W. Kipnis
Atty.

United States Patent Office 3,237,699
Patented Mar. 1, 1966

3,237,699
BULB DIGGING AND SEPARATING APPARATUS
Frank Bretveld and Marion Romein, both of
Rte. 3, St. Ann, Ill.
Filed Mar. 4, 1964, Ser. No. 349,227
2 Claims. (Cl. 171—18)

The invention relates to improvements in apparatus for digging bulbs and bulblets from the ground and separating the same.

More particularly, the invention is concerned with the novel construction and assembly of apparatus of a kind to be drawn and powered by a farm tractor or like vehicle. The apparatus is used to dig up bulbs and bulblets which are conveyed to oscillatable gratings which discharge entrained soil and separate the bulblets from the bulbs and delivers each to separate container means. Heretofore the digging and removal of bulbs from the ground has been accomplished manually with the resultant expenditiure of many man-hours and questionable recovery of the bulblets.

It is therefore an object of the invention to provide apparatus of the character referred to.

Another object of the invention is to provide novel means for breaking the soil and removing the bulbs and bulblets from the ground, separating the bulbs and bulblets from the soil which is then returned to the ground and finally separating the bulbs from the bulblets.

Another object is to provide novel means for breaking the ground preliminary to recovery of the bulbs and bulblets.

Another object is to provide novel oscillatable means for separating bulbs from each other and from the soil.

Another object is to provide novel oscillatable means for separating soil from bulblets.

Another object is to provide novel sweeper means in association with bulb agitator means.

Another object is to provide apparatus of the character described which is not too expensive to construct, which is ruggedly constructed, easy to maintain serviceable and to operate, entirely automatic in its operation and very efficient in its use.

The structure by means of which the above noted and other advantages and objects of the invention are attained will be described in the following specification, taken in conjunction with the accompanying drawings, showing a preferred illustrative embodiment of the invention, in which:

FIG. 1 is a side elevational view of the apparatus.

FIG. 2 is a plan view thereof, showing the associated tractor wheels in dotted lines.

FIG. 3 is an elevational view of the rear or discharge end of the apparatus.

FIG. 4 is a horizontal sectional view of the oscillating means, taken substantially on line 4—4 of FIG. 1, but omitting the bulblet frame which is illustrated in dot-dash lines.

FIG. 5 is an enlarged detail view of the bulblet oscillator frame and oscillating means, taken substantially on line 5—5 of FIG. 4.

FIG. 6 is a vertical sectional view of the oscillatable frames taken on line 6—6 of FIG. 2.

FIG. 7 is a perspective view of one of the oscillating shafts.

FIG. 8 is an enlarged vertical sectional view of the soil breaker and conveyor scoop, taken on line 8—8 of FIG. 2.

FIG. 9 is a plan view of the structure shown in FIG. 8.

The digging and separating apparatus illustrated in an exemplary form in the accompanying drawings is designed to be attached to and be drawn by a tractor of any suitable make or by any other suitable powered vehicle. It includes a base frame structure 11, which is substantially rectangular in horizontal plan and which has forwardly extending beams 12 and 13 spaced apart and between which is disposed a conveyor frame assembly, generally shown at 14. The base frame structure has at its rear end a superstructure integral therewith consisting of spaced uprights 15 and side rails 16. The latter extend forwardly of the forward uprights 15 to define upper rails 17 upon which bearing journals 18 are mounted. The forward end of the base frame structure 11 has, on one side, a pair of spaced uprights 19 which mount bearing angles 21 between which one end of the housing 22 of a tractor wheel axle 23 is secured, as by tie bolts 24. The base frame 11 also has a lateral extension 26 at its rear end on which an oscillatable frame, to be described presently, is mounted. This lateral extension has a forwardly extending frame portion (FIG. 2) including spaced beams 26 which afford means for securing the apparatus to the tractor frame and which includes a pair of uprights 27 that embrace and are secured to the other end of the axle housing 22. The tractor axle housing 22 and its wheels 28 are shown in dot-dash lines. The rear end of the apparatus may be supported on a wheeled platform 20.

The transversely aligned bearing journals 18 receive the ends of a shaft 31 which pivotally mounts the conveyor frame assembly 14 between said journals. As best shown in FIG. 1, this conveyor frame assembly extends a short distance rearwardly of said shaft and its other end is of considerable length and mounts at its extreme end a scoop 32. An endless conveyor like-belt chain 33 is journalled in said conveyor frame assembly on shafts 34-35, the latter of which extends laterally thereof to one side and mounts securely a pulley 36 (FIG. 2). This pulley has a belt 37 trained over it and said belt is engaged with a pulley 38 on a take-off stud shaft that projects from a gear box housing 39 mounted on the base frame 11. The gear box housing includes conventional gear trains and has a shaft 41 extending therefrom. Said shaft 41 carries a pulley 42 over which is trained a belt 43 which also is trained over a pulley 44 carried on the power take-off shaft 45 of the tractor or other vehicle.

Referring specifically to FIGS. 8 and 9, the lower or scoop end of the conveyor frame assembly 14 carries the forwardly extending scoop 32 which preferably is in the form of a pointed blade that is adapted to engage beneath the ground surface at a level below the level of the bulbs to be removed. In order to raise and lower the conveyor frame assembly for disengaging or engaging the scoop 32 in the ground at a desired depth there is provided a hydraulic piston-cylinder assembly 46 (FIG. 1) which is connected at 47 to a bail 48 on said assembly and to a part of the tractor, as at 49. A pair of circular cutter blades 51, mounted on a freely rotatable shaft 52 are arranged above and one adjacent to each side edge of blade 32. The shaft 52 is carried in a pair of arms 53 each mounted at one end on the upper end of one of a pair of uprights 54 carried by the conveyor frame assembly. When the conveyor frame and its conveyor are in a lowered or ground cutting position (dotted lines in FIG. 1) the circular cutter blades 51 define the side edges of the cut to be performed and the ground between said cutter blades is scooped up by the blade 32 and delivered to the conveyor chain 33. Any loose dirt that finds its way to the outside of the circular cutter blades is plowed off the scoop 32 by side plates 55 which are mounted for angular adjustment on the scoop 32, as by means of pivots 56.

The bulbs, bulblets and dirt conveyed up the endless conveyor chain 33 are deposited upon an oscillatable frame 57 supported adjacent the upper discharge end of said conveyor between the upper frame structure rails 17.

This oscillatable frame 57 comprises a rectangular built-up frame including upper side bars or angles 58 and lower bars 59. A grill or grating 61 is arranged between the side angles 58 which consists of a plurality of closely arranged rods 62 which define a perforate surface upon which the bulbs, bulblets and dirt are deposited by the conveyor. Referring now to FIG. 1, the oscillatable frame 57 is supported in its elevated position by angularly disposed inherently stiff but flexible web assemblies 63-64. As shown the assembly 63 comprises one or more layers of heavy duty rubberized corded fabric 65 clamped securely at its upper edge in a strap bracket 66 secured to the frame rails 58, and at its lower edge to a bar 67 secured firmly to and bridging the rearmost uprights 16. The other assembly 64 also comprises one or more layers 68 of like material which is anchored along its upper edge to a strap bracket 69 secured to the underside of upper frame rail 58 and at its lower end to a bar 71 secured to and bridging the forward uprights 16. The bar 69 also has secured to it, as at 72, the upper margin of a tough rubberized corded fabric web 73, the lower edge of which is connected, as by straps 74, one to each of a pair of eccentric bearings 75. The bearings 75 are journalled on an eccentric shaft 76 (FIG. 7) mounted in bearings 77 supported on the base frame members 12. Said shaft extends laterally beyond one of said frame members 12 and, as shown in FIG. 2, mounts a pulley 78 over which is trained a belt 79 that is trained over a pulley 81 carried on the stud shaft on which the pulley 38 is mounted.

During operation, rotation of the eccentric shaft 76 imparts oscillatory motion to the oscillatable frame 57 of sufficient intensity as to cause dirt particles and bulblets to fall through the spaces in the grating 62 thereof and onto a second oscillatable frame assembly, generally indicated at 82. Since this frame assembly underlies but the rear portion of the frame 57, a floor 83 (FIG. 6) underlies the forward area of said frame 57 to direct bulblets and dirt onto the frame 82.

The oscillatable frame 82 mounts a grating 82a and the frame mounting is substantially like the mounting previously discussed hereinabove and, as best shown in FIG. 5, it comprises a pair of oppositely inclined web support assemblies 84-85 each comprised of a base strap 86 secured firmly to base frame 12 and a top strap 87 secured to the frame 82. Said respective straps have extending between them and secured to each, one or more layers of relatively stiff rubberized corded fabric 88. This fabric 88 has sufficient rigidity to maintain the frame 82 in the elevated position shown. In order to oscillate same, a second laminae of heavy duty rubberized corded fabric 89 is secured at its upper edge to the frame 82 and its lower edge to a pair of eccentric bearings 91 mounted on an eccentric shaft 92 (like shaft 76) one end of which extends outwardly beyond the frame edge and carries a pulley 93. A pulley 94 on the power input shaft 41 is connected to said pulley 93 by a belt 95. The grating 82a is comprised of rods which are spaced apart distances to prevent bulblets from dropping through while allowing all dirt to drop therefrom.

In order to separate dirt, and other foreign matter from the bulbs and to separate bulblets from the bulbs as they advance along the oscillatable grating 61, suitable sweeper means is provided preferably in the form of a rotor 96 (FIGS. 2 and 3). As shown, this rotor may comprise a rotatable vertical shaft 97 journalled in vertical adjustable cross bars 98 supported above the frame 57 as by uprights 99. The shaft carries on its upper end a pulley 101 which is connected to a pulley 102 on gear box housing 39 by a belt 103. The shaft terminates above the grating 61 and carries on its lower end a sweeper preferably comprised of four radially disposed arms 104 each carrying a plurality of flexible fingers 105 that sweep across the surface of the grating to agitate the bulbs and dislodge dirt and bulblets therefrom.

It should be evident at this time that the apparatus affords novel means for digging up bulbs and bulblets, conveying them to an oscillatable assembly where they are separated one from the other and the bulblets and dirt dropped onto a second oscillatable assembly which discharges all foreign matter. The bulbs are ultimately delivered off the end of the first named assembly into suitable receptacles (not shown) whereas the bulblets are discharged laterally off the end of the second assembly into a suitable receptacle (not shown). Obviously suitable gears may be substituted for the pulley arrangements shown.

Although we have described a preferred embodiment of our invention, in considerable detail, it will be understood that the description thereof is intended to be illustrative, rather than restrictive, as many details of the structure disclosed may be modified or changed without departing from the spirit or scope of the invention. Accordingly we do not desire to be restricted to the exact construction described.

We claim:

1. Apparatus for removing bulbs and bulblets from the ground and separating same comprising, in combination, an elongated frame structure, conveyor means carried by said frame structure, means to scoop up bulbs, bulblets and surrounding dirt and deliver same to the conveyor, a first oscillatable grating onto which said bulbs, bulblets and dirt are deposited by the conveyor means, means arranged above and rotatable in a plane parallel to the first grating to effect physical separation of the dirt and bulblets from the bulbs, means to oscillate said grating to discharge bulblets and dirt therethrough, a second grating arranged below said first grating to receive said bulblets and dirt, and separate means to oscillate the second grating in a direction at right angles to the direction of oscillation of the first grating to discharge dirt therethrough, said bulbs and bulblets moving toward discharge ends of the respective gratings during oscillation thereof.

2. Apparatus for removing bulbs and bulblets from the ground and separating same comprising, in combination, an elongated frame structure, conveyor means carried by said frame structure, means to scoop up bulbs, bulblets and surrounding dirt and deliver same to the conveyor, a first oscillatable grating onto which said bulbs, bulblets and dirt are deposited by the conveyor means, means arranged above and rotatable in a plane parallel to the first grating to effect physical separation of the dirt and bulblets from the bulbs, means to oscillate said grating to discharge bulblets and dirt therethrough, a second grating arranged below said first grating to receive said bulblets and dirt, and separate means to oscillate the second grating to discharge dirt therethrough, said bulbs and bulblets moving toward discharge ends of the respective gratings during oscillation thereof.

References Cited by the Examiner

UNITED STATES PATENTS

| 830,362   | 9/1906  | Pennick  | 171—25 X  |
|-----------|---------|----------|-----------|
| 1,478,952 | 12/1963 | Hanks    | 171—130 X |
| 2,209,282 | 7/1940  | Rodin    | 171—130 X |
| 2,269,298 | 1/1942  | Widuch   | 171—11    |
| 3,078,926 | 2/1963  | Ries     | 171—132 X |
| 3,106,249 | 10/1963 | Zachery  | 171—14    |

OTHER REFERENCES

Application No. 1,072,422, printed December 1959, Germany, Hermann, 171-14 (3 shts. dwg., 4 pp. spec.).

ABRAHAM G. STONE, *Primary Examiner.*

ANTONIO F. GUIDA, *Examiner.*